US010430807B2

(12) United States Patent
Duggal et al.

(10) Patent No.: US 10,430,807 B2
(45) Date of Patent: Oct. 1, 2019

(54) AUTOMATIC CREATION AND REFINING OF LEAD SCORING RULES

(71) Applicant: Adobe Inc., San Jose, CA (US)

(72) Inventors: Ashish Duggal, New Delhi (IN); Stephane Moreau, L'Hay les Roses (FR); Anmol Dhawan, Ghaziabad (IN); Sachin Soni, New Delhi (IN)

(73) Assignee: Adobe Inc., San Jose, CA (US)

(*) Notice: Subject to any disclaimer, the term of this patent is extended or adjusted under 35 U.S.C. 154(b) by 762 days.

(21) Appl. No.: 14/602,774

(22) Filed: Jan. 22, 2015

(65) Prior Publication Data
US 2016/0217476 A1    Jul. 28, 2016

(51) Int. Cl.
*G06Q 30/02* (2012.01)
(52) U.S. Cl.
CPC .................. *G06Q 30/0201* (2013.01)
(58) Field of Classification Search
None
See application file for complete search history.

(56) References Cited

U.S. PATENT DOCUMENTS

| | | | |
|---|---|---|---|
| 7,035,699 B1 * | 4/2006 | Anderson | G06Q 20/20 700/90 |
| 7,596,501 B2 * | 9/2009 | Tivey | G06Q 30/02 705/317 |
| 7,664,668 B2 * | 2/2010 | Lissy | G06Q 10/06 705/7.13 |
| 8,352,306 B2 * | 1/2013 | Rose | G06Q 30/0201 705/7.29 |
| 8,417,560 B2 * | 4/2013 | Woods | G06Q 30/00 705/14.41 |

(Continued)

FOREIGN PATENT DOCUMENTS

| | | | | |
|---|---|---|---|---|
| WO | WO-2008086444 A1 * | 7/2008 | | G06Q 30/02 |
| WO | WO-2008086451 A1 * | 7/2008 | | G06Q 10/06375 |

(Continued)

OTHER PUBLICATIONS

Yan, Junchi, et al. "On machine learning towards predictive sales pipeline analytics." Twenty-Ninth AAAI Conference on Artificial Intelligence. 2015. (Year: 2015).*

(Continued)

*Primary Examiner* — Thomas L Mansfield
*Assistant Examiner* — Derick J Holzmacher
(74) *Attorney, Agent, or Firm* — Kilpatrick Townsend & Stockton LLP

(57) ABSTRACT

Systems and methods disclosed herein score leads by determining and applying a scoring rule based on lead participation in an activity. This involves a processor of a computing device receiving information on participation in the activity by prior leads that resulted in conversions or rejections. A scoring rule is determined for the activity by assigning a score to the activity based on the information on participation in the activity by the prior leads that resulted in the conversions or the rejections. A new lead is scored using the scoring rule by assigning the new lead the score based on participation by the new lead in the activity. The scoring of the new lead can be used in various ways. In one example, the score of the new lead is used to determine to send a communication to the new lead.

20 Claims, 5 Drawing Sheets

(56) References Cited

U.S. PATENT DOCUMENTS

| | | | | |
|---|---|---|---|---|
| 8,489,447 | B1* | 7/2013 | Waldorf | G06Q 30/08 705/7.29 |
| 8,527,324 | B2* | 9/2013 | Richter | G06Q 10/00 705/7.38 |
| 8,626,563 | B2* | 1/2014 | Williams | G06Q 30/00 705/7.11 |
| 8,788,439 | B2* | 7/2014 | Martinez | G06N 3/0454 706/12 |
| 8,880,446 | B2* | 11/2014 | Wellman | G06N 20/00 706/12 |
| 9,218,574 | B2* | 12/2015 | Phillipps | G06N 20/00 |
| 9,646,262 | B2* | 5/2017 | Phillipps | G06N 20/00 |
| 2004/0064360 | A1 | 4/2004 | Meggs | G06Q 10/10 705/7.26 |
| 2004/0143484 | A1* | 7/2004 | Kapadia | G06Q 30/02 705/1.1 |
| 2005/0228704 | A1* | 10/2005 | Fishman | G06Q 10/06311 705/7.14 |
| 2008/0103876 | A1* | 5/2008 | Armstrong | G06Q 30/02 705/7.31 |
| 2008/0162487 | A1* | 7/2008 | Richter | G06Q 10/00 |
| 2008/0201184 | A1* | 8/2008 | Rose | G06Q 10/063 705/7.34 |
| 2008/0201202 | A1* | 8/2008 | Rose | G06Q 30/02 705/7.29 |
| 2008/0201203 | A1* | 8/2008 | Rose | G06Q 10/06375 705/7.34 |
| 2008/0201204 | A1* | 8/2008 | Rose | G06Q 10/06395 705/7.29 |
| 2008/0201205 | A1* | 8/2008 | Rose | G06Q 10/0631 705/7.13 |
| 2008/0313018 | A1* | 12/2008 | Kamm, IV | G06Q 10/00 705/7.12 |
| 2009/0018894 | A1* | 1/2009 | Zamani | G06Q 10/0637 705/7.29 |
| 2009/0234706 | A1* | 9/2009 | Adams | G06O 30/02 705/14.71 |
| 2010/0114663 | A1* | 5/2010 | Casas | G06Q 10/067 705/7.31 |
| 2010/0121684 | A1* | 5/2010 | Morio | G06Q 30/02 705/7.13 |
| 2010/0131339 | A1* | 5/2010 | Singh | G06Q 30/00 705/7.29 |
| 2010/0131835 | A1* | 5/2010 | Kumar | G06Q 30/0224 715/205 |
| 2011/0060642 | A1* | 3/2011 | Davis | G06Q 30/02 705/14.41 |
| 2011/0196716 | A1* | 8/2011 | Srinivasan | G06Q 30/0201 705/7.29 |
| 2011/0238456 | A1* | 9/2011 | Ray | G06Q 10/06311 705/7.13 |
| 2011/0246255 | A1* | 10/2011 | Gilbert | G06Q 10/063 705/7.14 |
| 2012/0072264 | A1* | 3/2012 | Perna | G06Q 30/0203 705/7.32 |
| 2012/0179476 | A1* | 7/2012 | Muncy | G06Q 30/0207 705/1.1 |
| 2012/0232955 | A1* | 9/2012 | Riazzi | G06Q 30/0204 705/7.32 |
| 2012/0278091 | A1* | 11/2012 | Yaseen | G06Q 30/0202 705/1.1 |
| 2013/0117081 | A1* | 5/2013 | Wilkins | G06Q 30/0248 705/14.4 |
| 2013/0124259 | A1* | 5/2013 | Chourey | G06Q 30/0201 705/7.29 |
| 2013/0149178 | A1* | 6/2013 | Sekiya | F01C 21/0836 418/55.1 |
| 2013/0204663 | A1* | 8/2013 | Kahlow | G06Q 30/0202 705/7.31 |
| 2013/0253981 | A1* | 9/2013 | Lipka | G06Q 30/0201 705/7.29 |
| 2013/0311235 | A1* | 11/2013 | Jaros | G06Q 10/0639 705/7.31 |
| 2014/0067463 | A1* | 3/2014 | Richter | G06Q 10/00 705/7.29 |
| 2014/0067470 | A1* | 3/2014 | Richter | G06Q 10/00 705/7.31 |
| 2014/0067485 | A1* | 3/2014 | Richter | G06Q 10/00 705/7.41 |
| 2014/0074564 | A1* | 3/2014 | Richter | G06Q 10/00 705/7.42 |
| 2014/0143012 | A1* | 5/2014 | Alon | G06Q 30/0202 705/7.29 |
| 2014/0143058 | A1* | 5/2014 | Lessin | G06Q 30/0261 705/14.58 |
| 2014/0149178 | A1* | 5/2014 | Hedges | G06Q 10/063112 705/7.29 |
| 2014/0156681 | A1* | 6/2014 | Lee | G06F 16/9535 707/754 |
| 2015/0032503 | A1* | 1/2015 | Chander | G06Q 30/0201 705/7.29 |

FOREIGN PATENT DOCUMENTS

| | | | | |
|---|---|---|---|---|
| WO | WO-2008086453 | A1 * | 7/2008 | G06Q 10/06395 |
| WO | WO 2008157326 | A2 * | 12/2008 | G06Q 10/00 |
| WO | WO-2008157326 | A2 * | 12/2008 | G06Q 10/00 |
| WO | WO-2011100097 | A2 * | 8/2011 | G06Q 10/06 |
| WO | WO-2012037578 | A2 * | 3/2012 | G06Q 30/02 |
| WO | WO-2014100738 | A1 * | 6/2014 | G06N 3/0454 |
| WO | WO-2014143482 | A1 * | 9/2014 | G06N 20/00 |
| WO | WO-2015148302 | A1 * | 10/2015 | G06N 3/084 |

OTHER PUBLICATIONS

Yan, Junchi, et al. "Sales pipeline win propensity prediction: a regression approach." Integrated Network Management (IM), 2015 IFIP/IEEE International Symposium on. IEEE, 2015. (Year: 2015).*

Ozertem, Umut, et al. "Learning to suggest: a machine learning framework for ranking query suggestions." Proceedings of the 35th international ACM SIGIR conference on Research and development in information retrieval. ACM, 2012. (Year: 2012).*

Yan, Junchi, et al. "Sales pipeline win propensity prediction: a regression approach." 2015 IFIP/IEEE International Symposium on Integrated Network Management (IM). IEEE, 2015. (Year: 2015).*

Bohanec, Marko, Mirjana Kljajić Borštnar, and Marko Robnik-Šikonja. "Explaining machine learning models in sales predictions." Expert Systems with Applications 71 (2017): 416-428. (Year: 2017).*

Duncan, Brendan Andrew, and Charles Peter Elkan. "Probabilistic modeling of a sales funnel to prioritize leads." Proceedings of the 21th ACM SIGKDD International Conference on Knowledge Discovery and Data Mining. ACM, 2015. (Year: 2015).*

Bera, Sasadhar, and Prasun Das. "An attempt to modeling rule base real time web funnel structure." Journal of Business and Retail Management Research 5.2 (2011). (Year: 2011).*

Florez-Lopez, Raquel, and Juan Manuel Ramon-Jeronimo. "Marketing segmentation through machine learning models: An approach based on customer relationship management and customer profitability accounting." Social Science Computer Review 27.1 (2009): 96-117. (Year: 2009).*

* cited by examiner

AUTOMATIC CREATION AND REFINING OF LEAD SCORING RULES

TECHNICAL FIELD

This disclosure relates generally to computer-implemented methods and systems and more particularly relates to improving the efficiency and effectiveness of computing systems used in assessing leads and communicating with leads.

BACKGROUND

Lead generation involves generating interest or inquiry into products or services of a business. Businesses strive to generate more qualified leads, those with a higher probability of a desired outcome. A lead scoring rule is a convention that allows a marketer to define some activity or behavior and associate certain points with that activity or behavior for the purpose of assessing the quality of a lead. All the prospects that do such an activity or behavior (herein referred to as an "activity" for simplicity) will qualify under the lead scoring rule and will be given the number of points defined in the rule. The activities shown by prospects can be both explicit (event attendance, newsletter subscription, document download on a website) and implicit (number of visits to a website, types of pages viewed, etc.). For example, a lead scoring rule created by a marketer may assign 7 points to all the prospects who attended a Trade show event.

Every lead will be assigned scores based on the activities of that lead. These scores can be averaged, added, or otherwise combined into an overall score for the lead that is used to assess or categorize the lead. In one example, leads are categorized as "hot," "warm," or "cold" based on each lead's overall score. Hot Leads are the people who are most interested in the marketer's product or service and are prioritized over less promising leads. For example, information on hot leads may be sent to sales department for immediate follow up. In this example, warm leads are less promising than hot leads and are sent to a nurturing program and eventually either become hot leads or cold leads based on whether the prospects take part in further activities and based on their level of participation in those activities. In this example, cold leads are people who are not interested in the marketer's product or service and hence their information is not sent to sales department.

While such scoring of leads can be extremely valuable, it is also generally very burdensome on the marketers since scores are assigned according to the lead scoring rules defined by the marketer manually. For example, the marketer has to decide whether attending a trade show organized by the marketer is worth 6 point, 7 points, or some other number of points to create a lead scoring rule for that activity. The marketer creates the lead scoring rule by assigning such a score to each activity based on his experience and gut feelings. There can be hundreds or thousands of activities, and making a scoring rule for each of these activities can be extremely cumbersome, burdensome, and complex job for the marketer. Further, the marketer is assigning the score for each scoring rule based on his experience and without the benefit of empirical data. These gut feeling scoring assignments have little or no relationship to actual conversion and rejections of the lead and thus may not result in the best leads being generated, which will result in loss of time and money. Additionally, these manually-assigned scores are also static once they are created and thus fail to account for changes in the significance of activities to conversions and rejections over time.

SUMMARY

Systems and methods disclosed herein score leads by determining and applying a scoring rule based on lead participation in an activity. This involves a processor of a computing device receiving information on participation in the activity by prior leads that resulted in conversions or rejections. A scoring rule is determined for the activity by assigning a score to the activity based on the information on participation in the activity by the prior leads that resulted in the conversions or the rejections. A new lead is scored using the scoring rule by assigning the new lead the score based on participation by the new lead in the activity. The scoring of the new lead can be used in various ways. In one example, the score of the new lead is used to determine to send a communication to the new lead.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
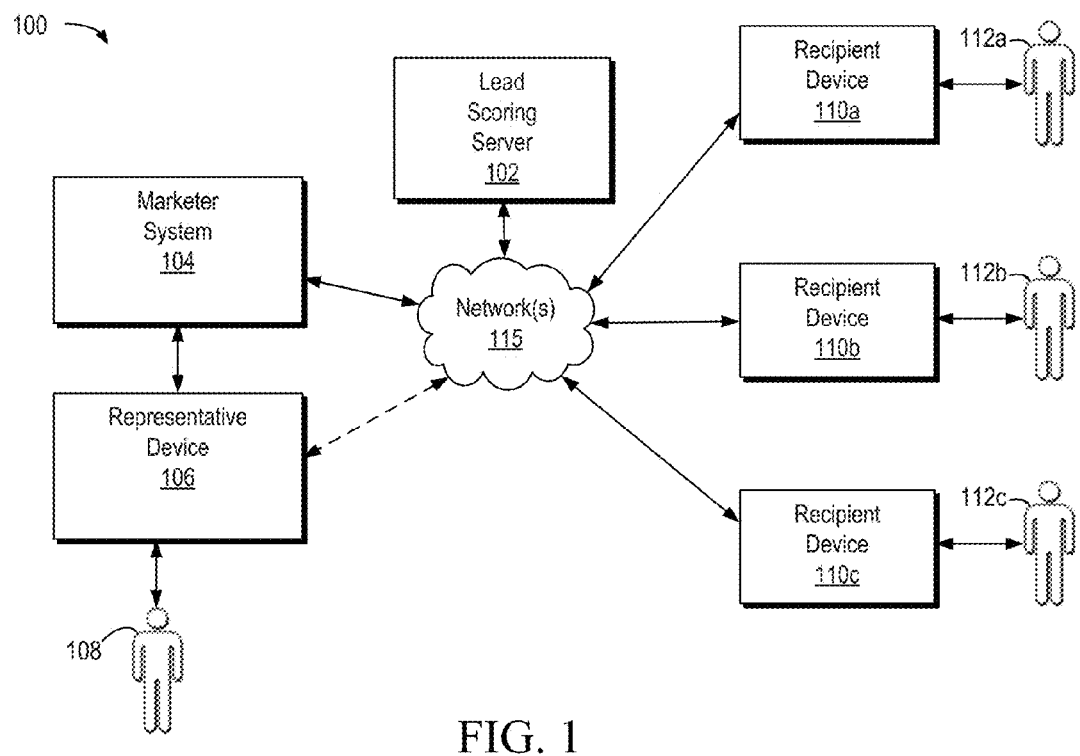
FIG. 1 is a block diagram depicting an example of a system for scoring leads by determining and applying a scoring rule based on lead participation in an activity.

Existing techniques for assigning scoring rules for activities in lead generation systems are subjective, burdensome, and static. To improve the efficiency and effectiveness and reduce the burden on users, computer-implemented systems and methods are disclosed for automatic creation and refining of lead scoring rules based on which activities are causing more actual conversions as compared to actual rejections and vice versa. This reduces the effort on the part of the marketer with respect to providing scores to various activities to create the scoring rules and will also result in generating high quality leads. If a marketer has already provided scores to various activities, the scoring rules can be automatically refined based on which activities are causing more conversions than rejections and vice versa so as to generate higher quality leads. A machine learning algorithm can be used to create and/or refine scoring rules. Such an algorithm can be run periodically to ensure that activities which are becoming more or less relevant with time are identified so that leads with the highest relevance are always generated. This allows the system to account for changes in the significance of activities that develop over time.

One embodiment involves a computing device tracking or using information on participation in an activity by prior leads that resulted in actual conversions and actual rejections. As examples, the information may include the percentage of converted leads who performed the activity or the percentage of rejected leads who performed the activity, or both. The information about actual conversions and actual rejections may be more accurate than a marketer's gut instinct about the significance of the activity in scoring the lead (e.g., to determine whether the lead is hot or cold) because the computer more comprehensively and accurately tracks and uses actual conversion and rejection data. This advantage is particularly significant when the number of potential activities is large. In one exemplary scenario, the system uses hundreds of different activities and thousands or even millions of leads may each participate in a particular combination of those activities. This complexity is essentially impossible to manually track and there is substantial risk that a marketer's gut instinct regarding the relative significance of each of the activities will greatly differ from the empirically determined significance.

The information on participation in the activity by prior leads that resulted in actual conversions and actual rejections is used to automatically determine or refine a scoring rule. For example, if the information shows that an activity is not correlated with conversion, the score for the activity may be lowered in that activity's lead scoring rule. Conversely, if information about recent leads shows that the activity is strongly correlated with conversion, the score for the activity may be increased in that activities scoring rule.

The scoring rule is used to score new leads. For example, the system may determine which activities a new lead has participated in and use lead scoring rules for each of those activities to determine a combined score for the lead. If that combined score is above a threshold value, the lead is classified as a hot lead and appropriate action is taken. For example, the lead may be identified as a hot lead to a sales system that sends a communication to pursue the new lead. Alternatively, the lead may be identified as a hot lead to a sales person who manually pursues the lead.

Because the use of actual conversion or actual rejection information in lead scoring rules results in more effective lead scoring rules, the generated leads are better, making conversions more likely for the pursued leads. This can reduce the time and processing of the computing systems involved in determining and pursing leads. For example, sending 100 e-mail messages to leads may result in the same number of conversion as sending 200 e-mails would have previously if the leads are more likely to convert. This improves the processing and efficiency of the computing system and can further reduce the burdens on the individuals involved in the lead generation and sales activities.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "activity" refers to any activity or behavior that a lead can perform, conduct, accomplish, or otherwise participate in. Examples of activities include, but are not limited to event attendance, newsletter subscription, document download on a website, exceeding a threshold number of visits to a website, and accessing a particular combination of types of web pages on a website.

As used herein, the phrase "lead" refers to person or entity identified as having an interest in or having made an inquiry regarding products or services of a business.

As used herein, the phrase "conversion" refers achieving a desired outcome from a lead. Examples of conversions include a sale of a product, a sale of a service, and entering a service contract.

As used herein, the phrase "rejection" refers to a lead not acting on a sales or marketing attempt or a lead otherwise declining a sales or marketing attempt.

As used herein, the phrase "scoring rule" refers to information that defines how to automatically determine a score based on predetermined criteria. An exemplary scoring rule defines that the activity of attending a trade show provides 10 points towards the score of any lead who participates in the trade show.

Referring now to the drawings, FIG. 1 is a block diagram depicting an example of a system for scoring leads by determining and applying a scoring rule based on lead participation in an activity. Lead scoring server 102 uses information on activity participation by prior leads that resulted in actual conversions or actual rejections to determine scoring rules for activities. This involves creating or refining scoring rules that assign scores to new leads that participate in particular activities. The scores determined for new leads are used to identify the best qualified leads. In one example, the new lead scores are used to categorize the leads as hot, warm, or cold leads. How qualified a lead is may determine how the lead is treated. For example, particular leads, such as hot leads, may be referred to marketing system 104 through network 115 for use by a marketer 106 using representative device 106 to access the marketer system 104. The marketer 108 may then use the marketer system to send marketing communications through the network(s) 115 to recipient devices 110a-c of hot leads 12a-c. For example, e-mail communications with special offers may be sent through network 115 to hot leads 112a-c using recipient devices 110a-c.

Figure 2:
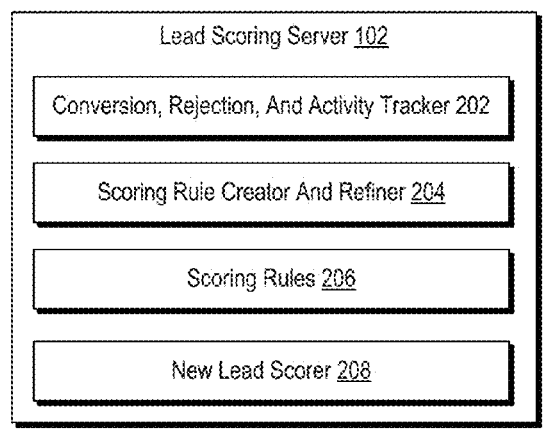
FIG. 2 is a block diagram illustrating exemplary modules for implementing functions in the lead scoring server of FIG. 1.

FIG. 2 is a block diagram illustrating exemplary modules for implementing functions in lead scoring server 102 of FIG. 1. Lead scoring server 102 includes modules 202, 204, 208 which each are implemented by a processor executing stored computer instructions. Module 202 tracks and stores information on activity participation by prior leads that resulted in actual conversions or actual rejections. Module 204 determines scoring rules 206 for activities by creating or refining scoring rules 206 that assign scores to leads that participate in particular activities based on participation those activities. Module 208 scores new leads using the scoring rules 206 determined by module 204.

Figure 3:
FIG. 3 is a block diagram depicting graphical representations of conversion and activity data that can be used by the system for scoring leads of FIG. 1.

FIG. 3 is a block diagram depicting graphical representations of conversion and activity data that can be used by the system for scoring leads of FIG. 1. The example of FIG. 3 illustrates data over a 90 day period in which four hundred and fifty two activities 300 were tracked with respect to nineteen hundred and fifty generated leads 302. Of the leads 302, six hundred and twenty leads where qualified as HOT leads 304. Five hundred opportunities 306 were selected from those HOT leads and five hundred opportunities 306 were generated from those HOT leads 304. Thirty five opportunities won 308 resulted from the opportunities generated 306. The conversion, rejection, and activity tracker 202 of FIG. 1 may track and store this information for use in creating and refining scoring rules.

Figure 4:
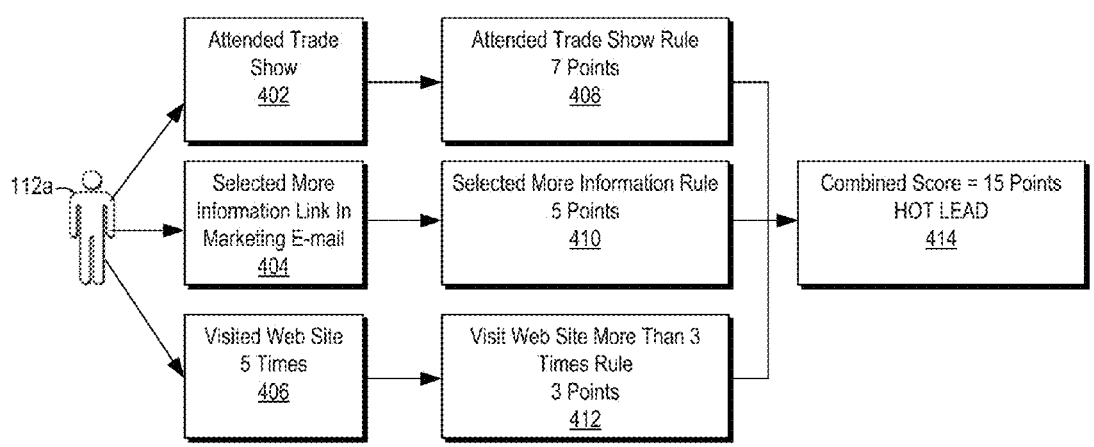
FIG. 4 provides an example of scoring a new lead based on activities in which the new lead participated.

FIG. 4 provides an example of scoring a new lead based on activities in which the new lead participated. In this example, the hot lead 112a attended a trade show, as shown in block 402, selected a more information link in a marketing e-mail, as shown in block 404, and visited a particular web site 5 times, as shown in block 406. The scoring rules 408, 410, 412 for these activities are used to determine a combined score of 15 points, qualifying the person as a hot lead, as shown in block 414. In this example, the attending the trade show scoring rule 408 specifies that attending the trade show provides 7 points, the selected more information rule 410 specifies that selecting the more information link in the marketing e-mail provides 5 points, and the visit web site more than 3 times rule 412 specifies that visiting the website more than 3 times provides 3 points. In this example, hot lead 112a has participated in activities that satisfy each of these three rules resulting in a combined score of 15 (7+5+3).

Figure 5:
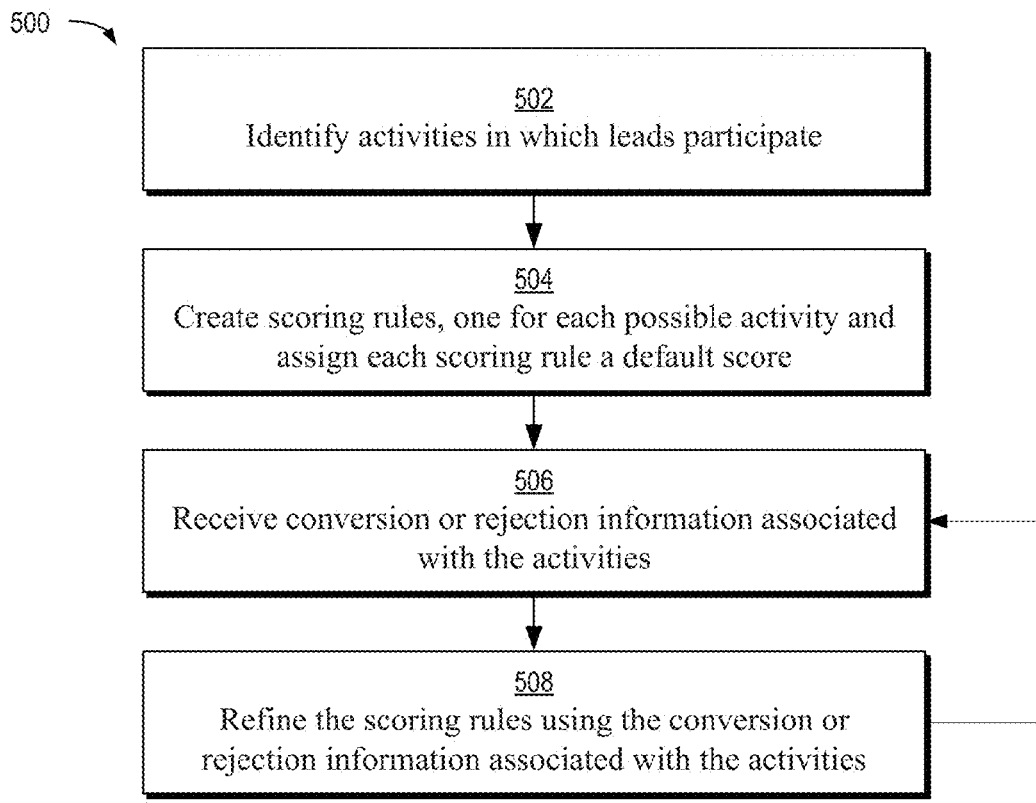
FIG. 5 is a flow chart of a method of automatic lead scoring rule creation and refinement.

FIG. 5 is a flow chart of a method 500 of automatic lead scoring rule creation and refinement. Method 500 can be performed by lead scoring server 102 of FIG. 1 or any other suitable device. Method 500 involves identifying activities in which leads participate, as shown in block 502. The activities can be identified manually, semi-automatically, or automatically based on information about prior leads.

Method 500 further involves creating a scoring rules for each possible activity and assigning each scoring rule a default score, as shown in block 504. The default scores are used until sufficient information is available to change the scores of the scoring rules. A marketing system may be designed to prioritize pursuit of hot leads. In such a system, until sufficient information is available to change the scores of the scoring rules some leads can be selected as hot leads based on non-historic criteria. For example, a subset of leads may randomly be selected as hot leads. Alternatively, leads that participated in more activities can initially be classified as hot leads until sufficient information is available to change the scores of the scoring rules and more intelligently select hot leads. Information about leads is collected for a period of time. During that time some of these leads will get converted and other leads will get rejected.

Method 500 receives the conversion or rejection information associated with the activities, as shown in block 506. For example, the method 500 may receive information about the percentage of the leads that converted who participated in a particular activity, e.g., identifying that 30% of converted leads attended a trade show.

Method 500 refines the default scores assigned to the activities in the scoring rules using conversion or rejection information, as shown in block 508. In one example, if a strong association between participation in an activity and conversion is identified, the score of the scoring rule for that activity is increased. Conversely, if a weak or negative association between participation in the activity and conversion is identified, the score for the scoring rule for that activity is decreased.

After a predetermined period of time or other occurrence, the method 500 returns to block 506 to again receive conversion or rejection information associated with the activities and then refines the scoring rules using the new conversion or rejection information, as shown in block 508. In this way, method 500 can periodically update the scoring rules based on new information about conversions or rejections.

Figure 6:
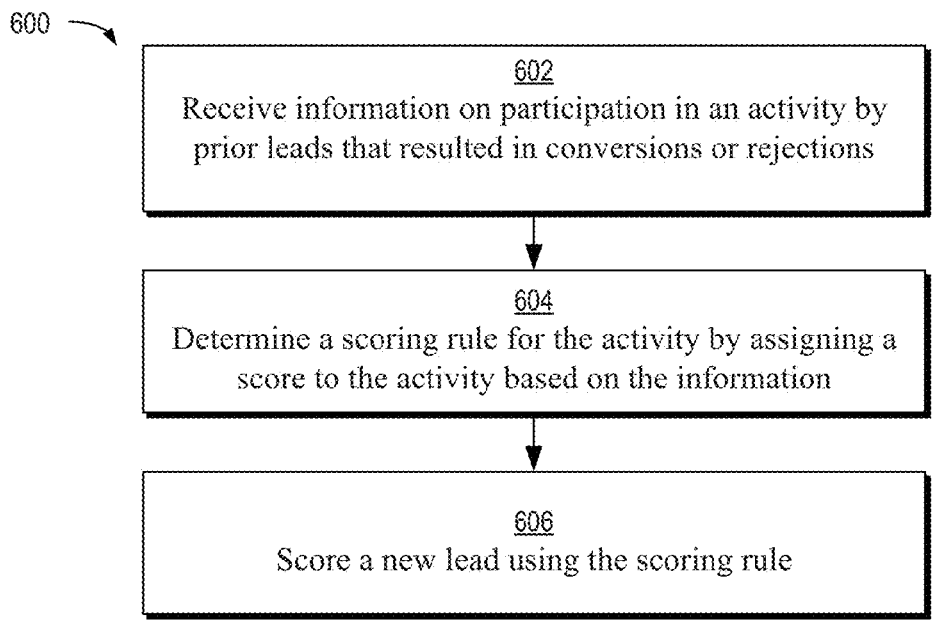
FIG. 6 is a flow chart of a method for scoring leads by determining and applying a scoring rule based on lead participation in an activity.

FIG. 6 is a flow chart of a method 600 for scoring leads by determining and applying a scoring rule based on lead participation in an activity. Method 600 can be performed by lead scoring server 102 of FIG. 1 or any other suitable device. Method 600 involves receiving information on participation in an activity by prior leads that resulted in conversions or rejections, as shown in block 602. This can involve, for example, receiving information about the percentage of the leads that converted who participated in a particular activity and the percentage of leads who rejected after participating in the particular activity.

Method 600 further involves determining a scoring rule for the activity by assigning a score to the activity based on the information, as shown in block 604. For example, a point-based scale can be used from −5 to 10 in which −5 represents the most negative correlation between an activity and conversion, 10 represents the most positive correlation between the activity and conversion, and 0 represents little or no correlation between the activity and conversion. Based on significant correlation between an activity and conversion, a score of 7 may be assigned for the scoring rule of the activity.

Method 600 next involves scoring a new lead using the scoring rule, as shown in block 606. This can involve determining whether a new lead participated in an activity and applying the scoring rule. For example, the scoring rule may specify that if the user has visited the web site 3 or more times, add 7 points to the lead's combined score. If the user has visited the web site only 2 times, no points are added to the lead's combined score. If the lead has visited the web site 3 time (or more), however, the seven points are added to the lead's combined score. The lead's combined score may combine scores based on all of the activities in which the lead participated. The lead's combined score can then be used to categorize the lead, for example, as a hot lead, a warm lead, or a cold lead.

Figure 7:
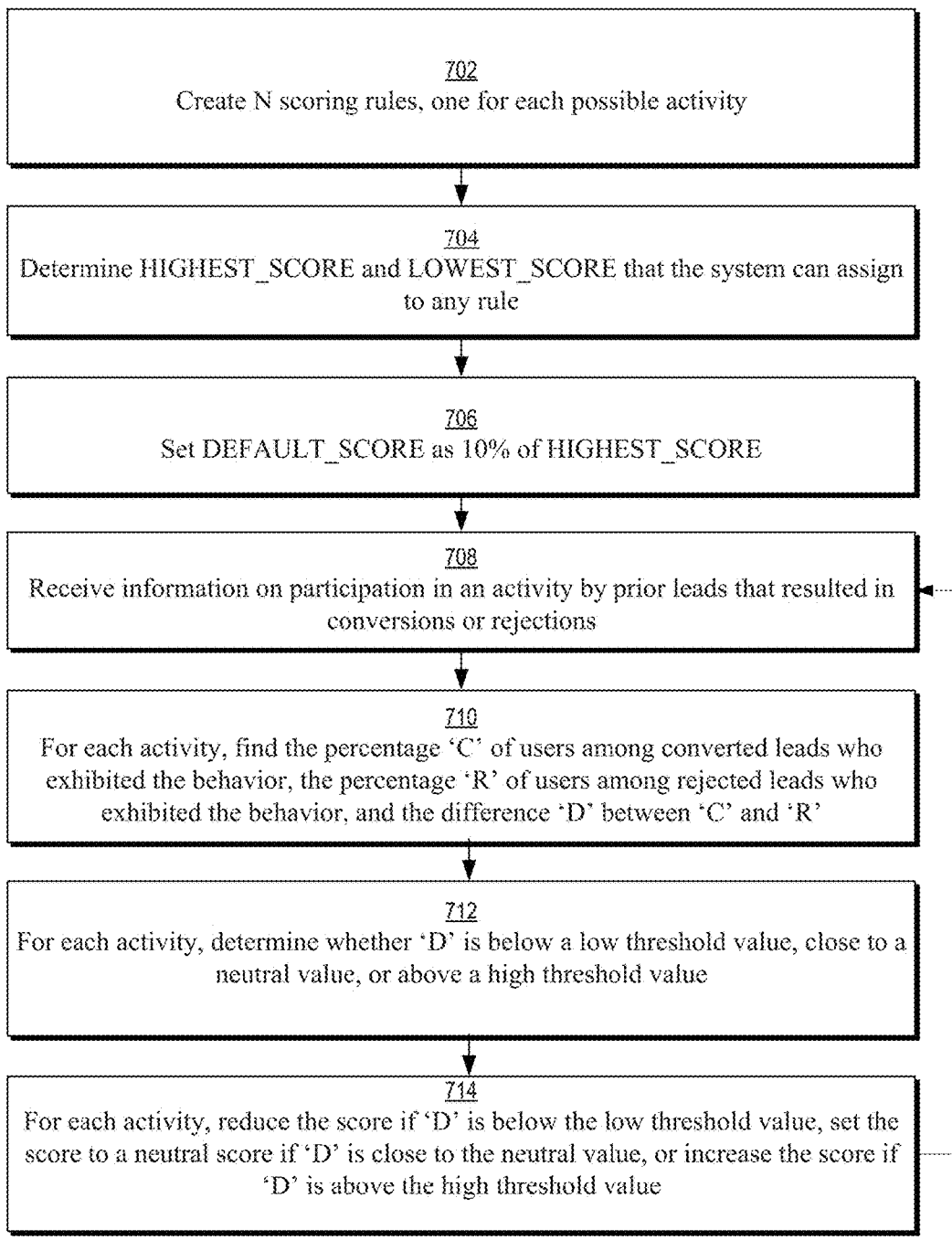
FIG. 7 is a flow chart of another method of automatic lead scoring rule creation and refinement.

FIG. 7 is a flow chart of another method 700 of automatic lead scoring rule creation and refinement. Method 700 can be performed by lead scoring server 102 of FIG. 1 or any other suitable device. This example assumes that there are N possible activities to which scores can be assigned. Method 700 involves creating N scoring rules, one for each possible activity, as shown in block 702.

In block 704, the method 700 determines HIGHEST_SCORE and LOWEST_SCORE that the system can assign to any rule. The HIGHEST_SCORE can be selected to avoid skewing in favor of any one of the activities. For example, if 50 total points is used as a threshold to qualify a prospect as a hot lead, a high score can be specified (e.g., 20) so that no single activity can provide enough points alone to qualify a lead as a hot lead. Even if an activity provides 20 points, activities in addition to this activity are required before a prospect can be marked as a hot lead. The system or the marketer will also specify a LOWEST_SCORE, which can be negative.

Method 700 next involves setting a default score, as shown in block 706. In this example, the DEFAULT_SCORE is set to be 10% of HIGHEST_SCORE. However, other percentages or techniques can be used to set the DEFAULT_SCORE. For example, the DEFAULT_SCORE may be set as the midpoint between the HIGHEST_SCORE and the LOWEST_SCORE. In another example, the DEFAULT_SCORE is set using the following formula:

$$\text{DEFAULT\_SCORE} = \sum_{i=0}^{N} S[i]/N$$

where N is the number of activities in the set 'S'.

In block 708, method 700 receives information on participation in each activity by prior leads that resulted in conversions or rejections. This information is used to provide a measure of correlation between each activity and conversion or rejection. For every activity, the method 700 finds the percentage 'C' of users among converted leads who exhibited this activity; finds the percentage 'R' of users among rejected leads who exhibited this activity; and finds the difference 'D' between 'C' and 'R', as shown in block 710.

In this example, the difference 'D' provides a measure of correlation between each activity and conversion or rejection and 'D' is used to determine adjustments to the corresponding scoring rule. To this end, as shown in block 712, the method 700 determines, for each activity, whether 'D' is below a low threshold value, close to a neutral value, or above a high threshold value.

The method 700 then adjusts a scoring rule for each activity. For each activity, method 700 reduces the score if 'D' is below the low threshold value, sets the score to a neutral score if 'D' is close to the neutral value, or increases the score if 'D' is above the high threshold value, as shown in block 714.

If 'D' is greater than 0 and above a threshold, this suggest that this activity is done more by users who finally convert as compared to those who do not convert. The threshold can be selected so that the score is only adjusted when a strong correlation is identified. In this way, the method 700 automatically determines that the score corresponding to this activity should be increased to adjust the lead scoring rule. The new score of the lead scoring rule can be determined in various ways. For example, the new score for the scoring rule may be determined using the following formula:

NEW_SCORE=DEFAULT_SCORE+(HIGHEST_SCORE−DEFAULT_SCORE)*$D$/100 where D/100 is 'D' divided by 100.

In one example in which a default score is 5, a high score is 20, and during the first run the difference is 80, the new score for the scoring rule of the activity is determined as 5+(20−5)*80/100=17. During a second run, if the difference is 50, the new score of the activity becomes 17+(20−17)*50/100=18.5. Using such a formula and repeating it periodically may move the scoring rule's score towards the highest score but the score can never exceed the highest score due to the check (HIGHEST_SCORE−DEFAULT_SCORE) in the formula, which ensures that as the score reaches close to highest score, the amount added won't cause the score to exceed the high score.

If 'D' less than 0 and below a threshold, this suggest that this activity is done more by leads who finally get rejected as compared to those who convert. Hence, the score of the scoring rule corresponding to this activity should be decreased. The threshold can be selected so that the score is only adjusted when a very weak correlation is identified. The following provides an example of a formula for reducing the score of the scoring rule:

NEW_SCORE=DEFAULT_SCORE−(DEFAULT_SCORE−LOWEST_SCORE)*|$D$|/100 where *|D|/100 is the absolute value of 'D' divided by 100.

If 'D' is 0 or close to 0 (e.g., within threshold values), this suggests that users doing this activity are equally likely to convert or get rejected and therefore, the algorithm will assign a neutral score (e.g., a ZERO in on embodiment) to this activity. This will ensure that users doing this activity do not get an advantage over users who are not doing this activity.

By adjusting scores of scoring rules based on prior conversion or rejection information, method 700 provides an optimal score associated with every activity. In one embodiment, both conversion and rejection information are used. In another embodiment, only conversion information is used. And in yet another embodiment, only rejection information is used.

At regular intervals or otherwise periodically, the adjusting steps of method 700 are run on a new set of leads that gets converted and rejected as is performed beginning in block 708. This will ensure that scoring rules adapt to changing behavior pattern of leads with time. In one embodiment, the marketer is given an option to give more weightage to recently converted and rejected leads as compared to old data. In another embodiment, the marketer is given an option to simply drop the old data and take only the recent data as specified by a time threshold provided by the marketer. For example, the marketer may specify that the system should only use data regarding conversions or rejections occurring within the last year.

Score rule refinements can be automatically implemented or can be suggested to the marketer as optional suggestions to help guide the marketer in manually implementing scoring rules. For example, an interface for specifying scoring rule details may include an information element that displays a scoring rule suggestion identifying a suggested score (e.g., 7) for the scoring rule. The information element may further provide information about the basis of the recommendation, for example, identifying a percentage of converted leads that performed the activity and a percentage of rejected leads that performed the activity.

The exemplary techniques for automatically determining scoring rules disclosed herein provide numerous benefits. Scoring rules can be created with less user input and can be based on historical data rather than gut feelings. A machine learning algorithm can be employed to use historical data related to conversions or rejections and automatically create and refine scoring rules. This provides more accurate and up-to-date scoring rules with less effort on the part of the marketer and others.

Figure 8:
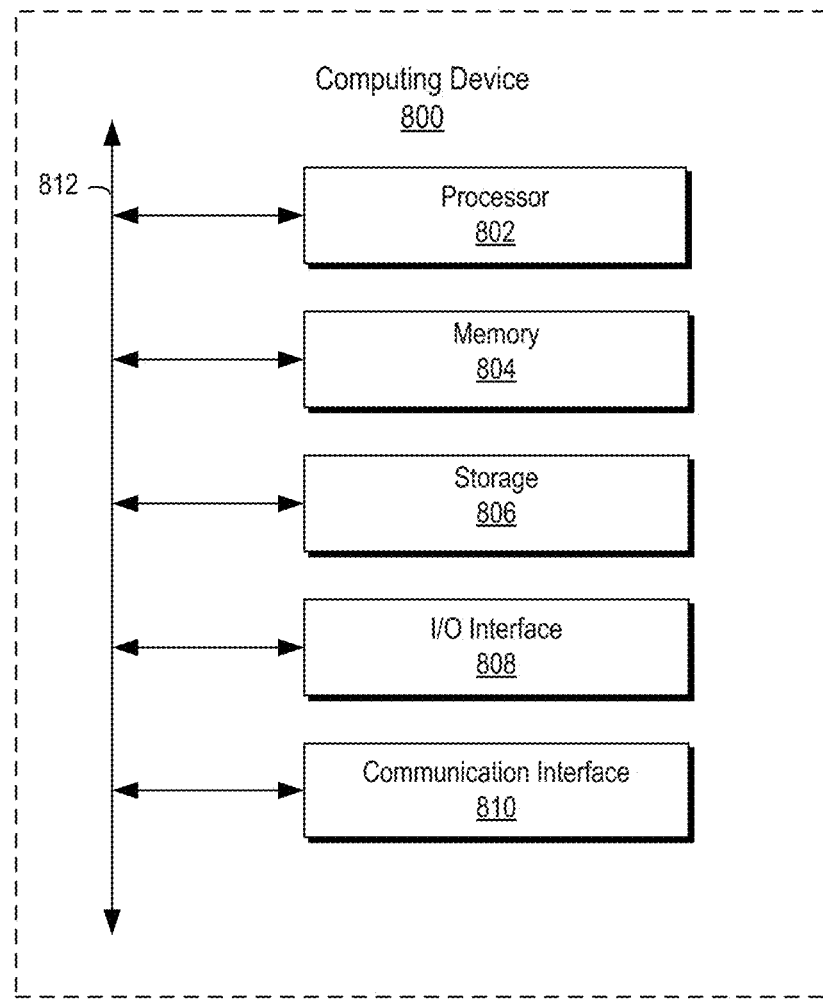
FIG. 8 is a block diagram depicting example hardware implementations for the components described in FIG. 1.

Any suitable computing system or group of computing systems can be used to implement the marketer computer devices 102, 104, 106, 110*a-c* of FIG. 1 or otherwise used to implement the techniques and methods disclosed herein. For example, FIG. 8 is a block diagram depicting examples of implementations of such components. The computing device 800 can include a processor 802 that is communicatively coupled to a memory 804 and that executes computer-executable program code and/or accesses information stored in the memory 804 or storage 806. The processor 802 may comprise a microprocessor, an application-specific integrated circuit ("ASIC"), a state machine, or other processing device. The processor 802 can include one processing device or more than one processing device. Such a processor can include or may be in communication with a computer-readable medium storing instructions that, when executed by the processor 802, cause the processor to perform the operations described herein.

The memory 804 and storage 806 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 may also comprise a number of external or internal devices such as input or output devices. For example, the computing device is shown with an input/output ("I/O") interface 808 that can receive input from input devices or provide output to output devices. A communication interface 810 may also be included in the computing device 800 and can include any device or group of devices suitable for establishing a wired or wireless data connection to one or more data networks. Non-limiting examples of the communication interface 810 include an Ethernet network adapter, a modem, and/or the like. The computing device 800 can transmit messages as electronic or optical signals via the communication interface 810. A bus 812 can also be included to communicatively couple one or more components of the computing device 800.

The computing device 800 can execute program code that configures the processor 802 to perform one or more of the operations described above. The program code can include one or more of the modules of FIG. 2. The program code may be resident in the memory 804, storage 806, or any suitable computer-readable medium and may be executed by the processor 802 or any other suitable processor. In some embodiments, modules can be resident in the memory 804. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for customizing electronic content delivery to target devices with machine learning algorithms that adaptively update scoring rules for content recipients, the method comprising:
receiving, by a lead scoring server, activity participation data indicating participation in an activity by prior leads that resulted in conversions or rejections;
correlating, with a machine learning algorithm executed by the lead scoring server, the activity with conversion events or rejection events;
creating, by the lead scoring server and using the machine learning algorithm, a scoring rule for the activity that assigns a score to the activity based on the activity participation data and a measure of correlation computed with the machine learning algorithm, wherein creating the scoring rule comprises:
identifying (i) a percentage 'C' of users among converted leads who participated in the activity and (ii) a percentage 'R' of users among rejected leads who participated in the activity,
computing a difference 'D' between 'C' and 'R' as the measure of correlation between the activity and conversion or rejection, and
modifying the score based on a comparison of the difference 'D' with a threshold;
scoring, by the lead scoring server and using the machine learning algorithm, a new lead using the scoring rule, wherein the new lead is assigned the score based on participation by the new lead in the activity;
transmitting, by the lead scoring server, the score to a marketer computing system and thereby causing the marketer computing system to transmit an electronic communication to a user device of the new lead; and periodically, by the lead scoring server and using the machine learning algorithm, updating the scoring rule based on subsequent activity participation data indicating participation in the activity that resulted in the conversions or the rejections, wherein periodically updating the scoring rule includes updating score data transmitted to the marketer computing system.

2. The method of claim 1 further comprising:
determining to send the electronic communication to the user device of the new lead based at least in part on the score being assigned to the new lead based on participation by the new lead in the activity and a threshold lead score; and
sending the electronic communication to the new lead.

3. The method of claim 1 wherein assigning the score to the activity comprises assigning the score without using a prior score previously assigned to the activity.

4. The method of claim 1 wherein assigning the score to the activity comprises assigning the score using a prior score previously assigned to the activity.

5. The method of claim 1 wherein determining the scoring rule comprises:
assigning a default score to the scoring rule; and
assigning the score by determining an amount to increase or decrease the default score based on the activity participation data by the prior leads that resulted in the conversions or the rejections.

6. The method of claim 1, wherein modifying the score based on the comparison of the difference 'D' with the threshold comprises:
determining that the difference 'D' is below a low threshold value; and
based on determining that the difference 'D' is below the low threshold value, reducing the score assigned to the activity for the scoring rule.

7. The method of claim 6 wherein reducing the score comprises reducing the score by an amount determined based on the difference 'D'.

8. The method of claim 1, wherein modifying the score based on the comparison of the difference 'D' with the threshold comprises:
determining that the difference 'D' is above a high threshold value; and
based on determining that the difference 'D' is above a high threshold value, increasing the score assigned to the activity for the scoring rule.

9. The method of claim 8 wherein increasing the score comprises increasing the score by an amount determined based on the difference 'D'.

10. The method of claim 1 wherein periodically updating the scoring rule comprises weighting recently converted or rejected leads higher than older converted or rejected leads in determining an updated score.

11. The method of claim 1 wherein periodically updating the scoring rule comprises using only recently converted or rejected leads without using older converted or rejected leads in determining an updated score.

12. The method of claim 1 further comprising:
determining a plurality of scoring rules for a plurality of activities by assigning respective scores to each of the plurality of activities based on information on participation in each of the plurality of activities by the prior leads that resulted in the conversions or the rejections; and
wherein the new lead is given a combined score based on participating or not participating in the each of the plurality of activities.

13. A lead scoring server system, the lead scoring server system comprising:
a processing device;
a communication device communicatively coupled to a marketer computing system, the communication device configured for:
transmitting score data to the marketer computing system and thereby causing the marketer computing system to transmit an electronic communication to a user device associated with a new lead, and
transmitting updated score data to the marketer computing system; and
a memory device communicatively coupled to the processing device,
wherein the processing device is configured to execute instructions included in the memory device to perform operations comprising:
receiving activity participation data indicating participation in an activity by prior leads that resulted in conversions or rejections;
correlating, with a machine learning algorithm, the activity with conversion events or rejection events;
creating, with the machine learning algorithm, a scoring rule for the activity that assigns a score to the activity based on the activity participation data and a measure of correlation computed with the machine learning algorithm, wherein creating the scoring rule comprises:
identifying (i) a percentage 'C' of users among converted leads who participated in the activity and (ii) a percentage 'R' of users among rejected leads who participated in the activity,
computing a difference 'D' between 'C' and 'R' as the measure of correlation between the activity and conversion or rejection, and
modifying the score based on a comparison of the difference 'D' with a threshold;
scoring, using the machine learning algorithm, the new lead using the scoring rule, wherein the new lead is assigned the score based on participation by the new lead in the activity;
configuring the communication device to transmit the score data to the marketer computing system;
periodically, using the machine learning algorithm, updating the scoring rule based on subsequent activity participation data in the activity that resulted in the conversions or the rejections; and
configuring the communication device to transmit the updated score data to the marketer computing system.

14. The lead scoring server system of claim 13, the operations further comprising:
determining to send the electronic communication to the user device of the new lead based at least in part on the score being assigned to the new lead based on participation by the new lead in the activity and a threshold lead score; and
sending the electronic communication to the new lead.

15. The lead scoring server system of claim 13, wherein determining the scoring rule comprises:
assigning a default score to the scoring rule; and
assigning the score by determining an amount to increase or decrease the default score based on the activity participation data by the prior leads that resulted in the conversions or the rejections.

16. A non-transitory computer-readable medium with program code stored thereon, wherein the program code is executable to perform operations comprising:

receiving activity participation data indicating participation in an activity by prior leads that resulted in conversions or rejections;

correlating, with a machine learning algorithm, the activity with conversion events or rejection events;

creating, with the machine learning algorithm, a scoring rule for the activity that assigns a score to the activity based on the activity participation data and a measure of correlation computed with the machine learning algorithm, wherein creating the scoring rule comprises:

identifying (i) a percentage 'C' of users among converted leads who participated in the activity and (ii) a percentage 'R' of users among rejected leads who participated in the activity, computing a difference 'D' between 'C' and 'R' as the measure of correlation between the activity and conversion or rejection, and modifying the score based on a comparison of the difference 'D' with a threshold;

scoring, using the machine learning algorithm, a new lead using the scoring rule, wherein the new lead is assigned the score based on participation by the new lead in the activity;

transmitting score data having the score to a marketer computing system and thereby causing the marketer computing system to transmit an electronic communication to a user device of the new lead;

periodically, using the machine learning algorithm, updating the scoring rule based on subsequent activity participation data indicating participation in the activity that resulted in the conversions or the rejections; and transmitting updated score data to the marketer computing system.

17. The non-transitory computer-readable medium of claim 16, wherein the program code is executable to perform operations further comprising:

determining to send the electronic communication to the user device of the new lead based at least in part on the score being assigned to the new lead based on participation by the new lead in the activity and a threshold lead score; and sending the electronic communication to the new lead.

18. The non-transitory computer-readable medium of claim 16, wherein the program code is executable to perform operations further comprising:

assigning a default score to the scoring rule; and assigning the score by determining an amount to increase or decrease the default score based on the activity participation data by the prior leads that resulted in the conversions or the rejections.

19. The lead scoring server system of claim 13 wherein periodically updating the scoring rule comprises weighting recently converted or rejected leads higher than older converted or rejected leads in determining an updated score.

20. The method of claim 1, wherein periodically updating the scoring rule includes updating score data transmitted to the marketer computing system and thereby causing the marketer computing system to exclude one or more user devices from transmissions of subsequent electronic communications, wherein causing the marketer computing system to exclude one or more user devices from the transmissions of subsequent electronic communications reduces one or more of processing resources and network resources as compared to transmitting the electronic communication prior to updating the scoring rule.

* * * * *